April 12, 1960 W. J. SCAVUZZO 2,932,400
FILTER UNIT
Filed April 1, 1957 2 Sheets-Sheet 1

WILLIAM J. SCAVUZZO
INVENTOR.

BY Lawrence J. Winter
ATTORNEY

April 12, 1960 W. J. SCAVUZZO 2,932,400
FILTER UNIT

Filed April 1, 1957 2 Sheets-Sheet 2

WILLIAM J. SCAVUZZO
INVENTOR.

BY Lawrence J. Winter
ATTORNEY

United States Patent Office 2,932,400
Patented Apr. 12, 1960

2,932,400
FILTER UNIT

William J. Scavuzzo, Clark, N.J., assignor to Purolator Products, Inc., Rahway, N.J., a corporation of Delaware Application April 1, 1957, Serial No. 649,985

6 Claims. (Cl. 210—235)

The present invention relates to a filter assembly, and more particularly to a filter assembly used in connection with hydraulic operating fluids.

In an effective filter system, it is necessary that the hydraulic operating fluid used therein be carefully filtered to the finest degree possible in order to avoid mechanical failures of the mechanisms which the fluid serves or lubricates by reason of the presence of solid impurities. The avoidance of such mechanical failures is particularly important in air craft. Thus, it is necessary at periodic intervals that the filter element in the filter assembly either be removed for cleaning if it is a permanent type filter, such as a metallic filter, or be replaced if it is a paper filter, such as a pleated resin impregnated paper filter.

One difficulty encountered in changing or cleaning these filters to maintain a high degree of filtration efficiency is the hydraulic fluid spills out of the system through the filter assembly when it is dismantled, thus causing loss of the hydraulic fluid from the system necessitating a tedious and prolonged clean-up operation. This further causes the hydraulic fluid system to lose pressure while the filter element is being cleaned or replaced.

In accordance with the present invention, a filter unit for a hydraulic fluid system is provided having novel means therein for overcoming these difficulties.

Another object of the present invention is to provide a filter unit wherein the filter element therein may be replaced or cleaned while the fluid in the system is maintained under pressure, as for example, in air craft landing gear systems, air craft cowl flap systems, and other aerodynamic systems.

A further object of the present invention is to provide a filter unit having safety means therein which automatically seal off the fluid system from the filter element therein should the filter element casing separate therefrom.

The invention will be better understood from the following description when considered in connection with the accompanying drawings forming a part thereof and in which.

Figure 1:
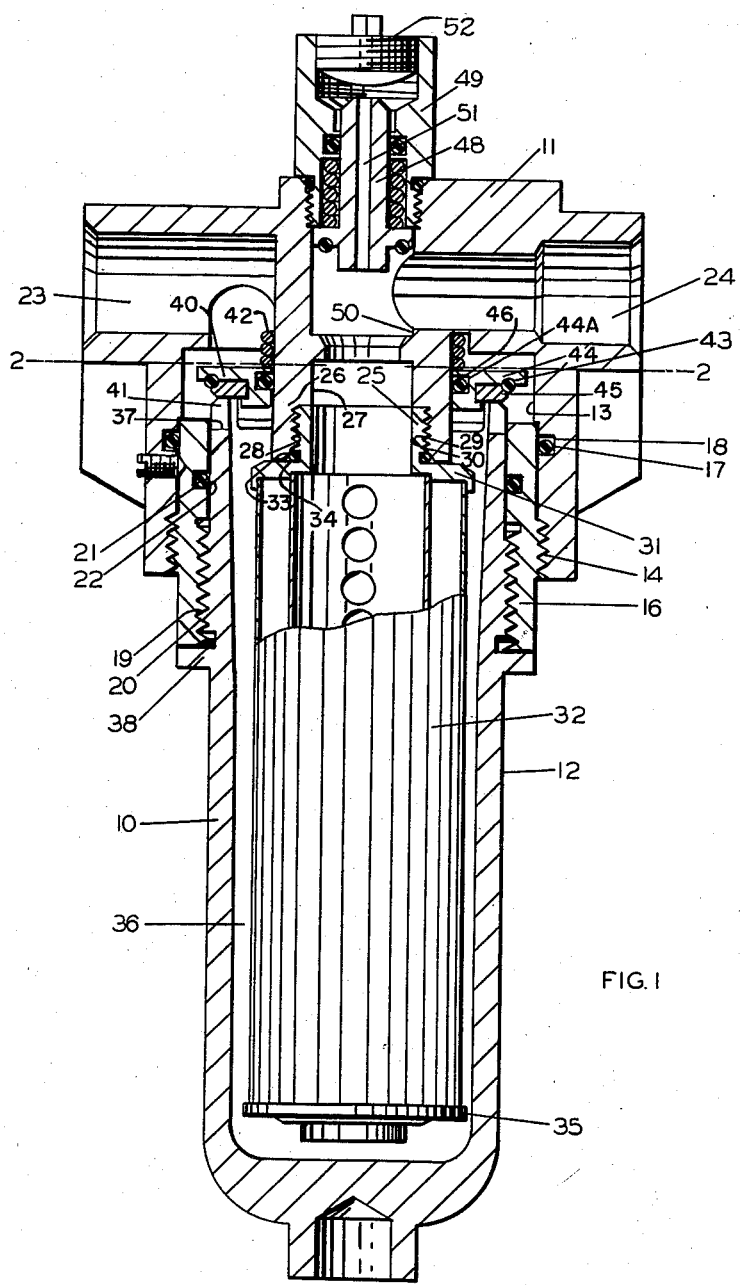
Fig. 1 is a vertical sectional view of the filter unit embodying the present invention with a portion of the filter element therein broken away.

Referring to the drawings, the reference numeral 10 generally designates an oil filter assembly comprising a hollow body or head 11 detachably connected to a main body member or casing 12.

Head 11 is provided with a bore 13 in the lower portion thereof internally threaded at 14 to receive the internally threaded portion of a sleeve 16. An O-ring seal 17 is disposed in a recess 18 on the inner periphery of bore 13 to prevent leakage of oil between the bore and sleeve. Sleeve 16 is internally threaded at 19 to receive external threads 20 on the upper portion of casing 12. An O-ring seal 21 is disposed in a recess 22 on the inner surface of sleeve 16 to prevent leakage of oil between the casing and sleeve.

The upper portion of head 11 is provided with horizontal inlet and outlet passages 23 and 24 respectively drilled therein through which high pressure oil to be filtered is passed. A center tube or tubular member 26 formed integral with head 11 extends downwardly from the top of the head and axially of bore 13. Preferably this tubular member 26 is concentrically disposed within the bore so that the bore is generally annular in shape. The bore 27 of tubular member 26 communicates with outlet passage 24. The lower portion of tubular member 26 has an enlarged bore 28 provided with threads 29 to receive external threads 30 on the neck 25 of annular end cap 31 of filter element 32 disposed in the casing 12. A tapered shoulder 33 is formed on the end of member 26 against which seats a sealing ring 34 mounted in a recess on end cap 31 to prevent leakage of oil between the tubular member and the end cap.

Filter element 32 is a conventional sintered metal element that is pleated to increase its filtering surface and sealed at the opposite ends thereof by end cap 31 and 35 so that fluid to be filtered must pass through the pleated section of the element. The interior side of the filter element communicates with the bore of tubular member 26 for discharging filtered oil thereto while the exterior side communicates with chamber 36 formed by casing 12 to receive incoming oil to be filtered.

Figure 4:
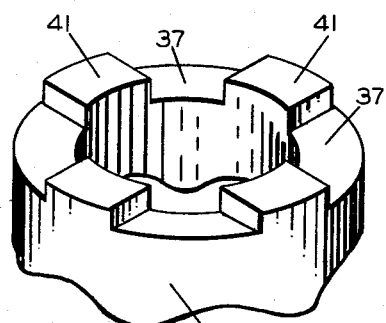
Fig. 4 is an enlarged fragmentary view of the casing embodied in the present invention.
Figure 2:
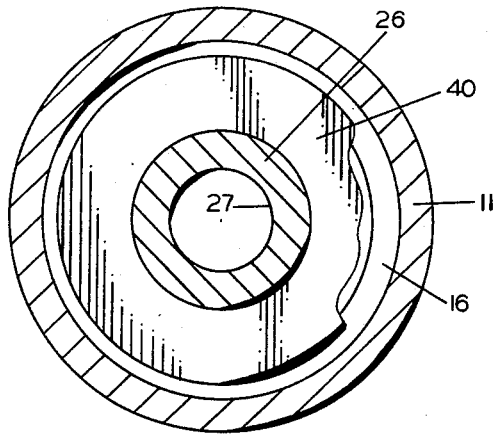
Fig. 2 is a transverse section taken on lines 2—2 of Fig. 1.

Referring to Fig. 4 the top of the open end of casing 12 is serrated or notched to form alternate inlet ports or slots 37 and projections 41 therein. A flange 38 is disposed on the outer periphery of casing 12 so that when the casing is threaded into sleeve 16 the flange stops its upward movement when inlet ports 37 are positioned above upper end of the sleeve 16 to permit communication between chamber 36 and the filter assembly inlet ports 23.

An annular valve 40 is slidably mounted on tubular member 26 and adapted to seat against projections 41 of casing 12. A spring 42 disposed on tubular member 26 above valve 40 supplies the force required to maintain the valve seated against projections 41. Valve 40 has an outside diameter less than the inside diameter of bore 13 to permit fluid from inlet passage 23 to flow around the valve perimeter and through ports 37 into the chamber of the casing. The outer diameter of valve 40 is greater than the inner diameter of sleeve 16 to permit the valve to seat thereon when casing 12 is removed from the assembly as hereinafter described.

Valve 40 is preferably made of an upper section 44 and a lower section 45 between which is positioned an O-ring seal 43. An annular recess 44a is provided on the inner periphery of section 44 and has an O-ring 46 disposed therein to prevent leakage of oil between tubular member 26 and the valve.

A spring loaded check valve 48 is positioned in a threaded cap member 49 threaded into the top of head 11. Check valve 48 is adapted to seat against a shoulder 50 formed in tubular member 26 to prevent oil that has been filtered and discharged from the assembly from flowing back thereto. Valve 48 is provided with a drilled passage 51 therein for bleeding air from the assembly by removing plug 52 when the filter unit is reassembled after the filter has been cleaned or replaced.

In operation, oil to be filtered in a system in which the filter unit of the present invention is embodied flows through inlet passage 23 into bore 13, around valve 40 and through ports 37 into filter chamber 36 of casing 12. Thereafter, the fluid flows through the pleated filter element 32 and has any impurities therein removed by the filter. Thereafter the cleaned or filtered fluid flows through annular end cap 31 and tubular member 26 into discharge passage 24 wherein it is discharged from the filter unit. During this normal operation valve 40 is held seated on projections 41 by the force in spring 42 while check valve 48 is in an opened position by reason of the oil pressure acting against the bottom thereof as shown in Fig. 1. The filter assembly of the present invention is preferably designed to operate at 3000 p.s.i.

Figure 3:
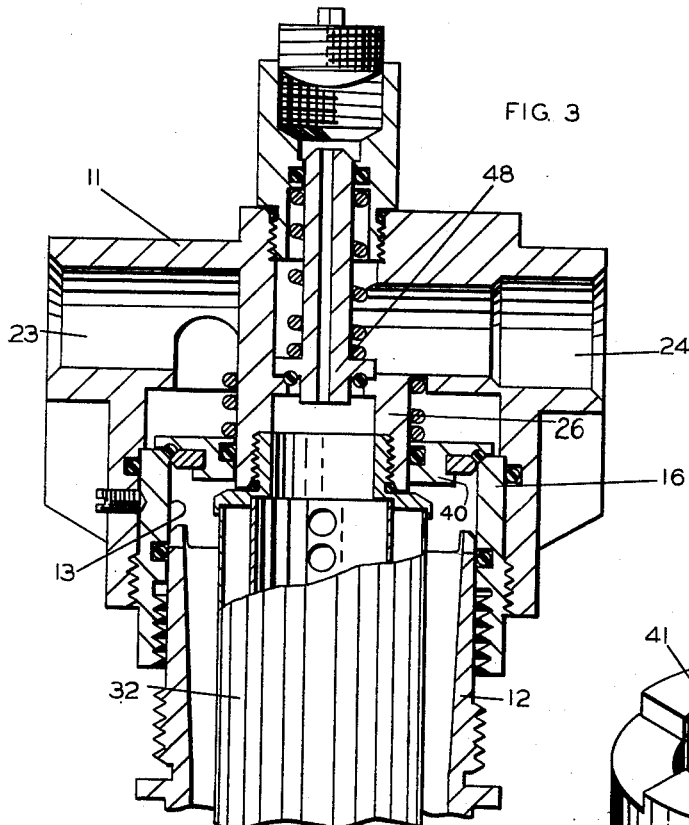
Fig. 3 is a fragmentary view similar to Fig. 1 showing the filter unit of the present invention as it is being dismantled to clean or replace the filter element therein.

When it is desired to clean filter element 32, or replace it while inlet and outlet passages 23 and 24 respectively are connected to the pressurized oil lubricating system not shown, the oil pressure in the system is reduced to approximately 40 to 50 p.s.i. Casing 12 is then separated from the filter assembly by merely threading it out of sleeve 16. As casing 12 is unthreaded the upper end thereof and projections 41 thereon move downwardly in bore 13 below the upper edge of sleeve 16, as shown in Fig. 3 while spring 42 forces valve 40 downwardly until O-ring 43 seats on tapered shoulder 47 formed on the upper edges of sleeve 16 to prevent loss of oil out of the filter unit. In addition to the positive action of spring 42 forcing valve 40 against sleeve 16, an additional reserve force is maintained against valve 40 to hold it in a seated position by the pressure of the oil acting against the upper side of valve 40.

Simultaneously with this action, the stoppage of oil flow-through the filter element into bore 27 of member 26 causes a decrease in the oil pressure which normally acts against the lower side of check valve 48 to maintain it in its opened position. Thereafter, valve 48 is forced downwardly by its spring so that the O-ring seal thereon seats on shoulder 50, as shown in Fig. 3 to close off discharge passage 24 from communication with bore 27 in tubular member 26 and the interior of filter element 32 to prevent any backflow of oil from the system into the filter element and casing. Filter element 32 is then disconnected from member 26 and cleaned and replaced while the lubricating system is maintained under pressure.

Inasmuch as changes may be made in the form, location and relative arrangement of the several parts without departing from the essential characteristics of the invention, it will be understood that the invention is not to be limited except by the scope of the appended claims.

What is claimed is:

1. A filter unit comprising a hollow cylindrical head with an inlet and outlet port and a concentric tube disposed therein having its lower end internally threaded and extending downwardly short of the end of said head, said tube having an outlet opening therein in communication with said outlet port, a threaded sleeve detachably threaded into the lower end of said head with its upper end extending beyond the lower end of said tube to define a valve seat, a cup like casing detachably threaded into the sleeve and having its upper end extending beyond the sleeve to provide a support for a valve member, the upper end of said casing above said sleeve being serrated to provide liquid ports therein in communication with said inlet port, an annular valve slidably mounted on said tube, a cylindrical annular filter element in said casing having a solid end cap and an annular end cap, said annular end cap being detachably threaded to said tube for support thereby, said element being spaced from the side and bottom walls of said casing, biasing means urging said valve against said casing when said casing is attached to said sleeve, and against said sleeve when said casing is detached from the head to shut off flow of liquid through said filter, and other valve means disposed within said tube below said opening adapted to close when said annular valve is seated to prevent flow therefrom.

2. The filter unit of claim 1 wherein said annular valve is of larger diameter than said casing and of less diameter than said sleeve to provide an annular passage therearound.

3. The filter unit of claim 1 wherein said tube is provided with a valve seat therein and said valve means is adapted to seat thereon and move to a shut-off position in the same direction as said annular valve.

4. A filter assembly comprising a head having an inlet and outlet port and a central bore therein, a tubular member depending from said head extending into said bore in communication with said outlet port, a sleeve threaded into said bore to extend above the lower end of said tubular member, check valve means in said tubular member to prevent back flow of fluid into said assembly from said outlet port, air bleed passage means extending through said check valve means for removing air from the assembly, a hollow casing detachably connected to said sleeve, a filter element disposed in said casing, said filter element having end caps on opposite ends thereto, one of said caps having a port therein in communication with said tubular member to permit flow of filtered fluid thereto, said casing having a serrated upper edge forming inlet ports therein in communication with said head inlet port and said filter element for passing fluid to be filtered therethrough, and slidable annular valve means mounted on said tubular member adapted to seat against said serrated casing edge during normal operation and to seat against said sleeve to close off communication of said head inlet port with said filter element when the casing is detached from the head.

5. A filter assembly comprising a head having an inlet and outlet port and a central bore therein, a tubular member depending from said head extending into said bore in communication with said outlet port, a sleeve threaded into said bore to extend above the lower end of said tubular member, check valve means in said head to prevent back flow of fluid into said assembly from said outlet port, air bleed passage means extending through said check valve means for removing air from the assembly, a hollow casing threaded into said sleeve having its upper end extending beyond said sleeve, a filter element disposed in said casing, said filter element having end caps on opposite ends thereof, one of said caps having a port therein in communication with said tubular member to permit flow of filtered fluid thereto, said casing having the portion thereof extending beyond said sleeve serrated to form inlet ports therein in communication with said head inlet port and said filter element for passing fluid to be filtered therethrough, and slidable annular valve means mounted on said tubular member adapted to seat against said serrated casing portion during normal operation and to seat against said sleeve to close off communication of said head inlet port with said filter element when the casing is threaded out of said sleeve.

6. A filter assembly comprising a head having an inlet and outlet port and a central bore therein, a tubular member depending from said head extending into said bore in communication with said outlet port, a sleeve threaded into said bore to extend above the lower end of said tubular member, check valve means in said head to prevent back flow of fluid into said bore from said outlet port, said valve means having an air outlet therein for removing air from the assembly, closure means for sealing said air outlet, a hollow casing threaded into said sleeve having its upper end extending beyond the end of said sleeve, a filter element disposed in said casing detachably connected to said tubular member, said filter element having end caps on opposite ends thereof, one of said caps having a port therein in communication with said tubular member to permit flow of filtered fluid thereto, said casing having the portion thereof extending beyond said sleeve serrated to form inlet ports therein in communication with said head inlet port and said filter element for passing fluid to be filtered therethrough, and slidable valve means mounted on said tubular member, said slidable annular valve means having a larger diameter than said casing and a smaller diameter than said bore and adapted to seat against said serrated casing portion adjacent said inlet ports during normal operation and to seat against said sleeve to close off communication of said head inlet port with said filter element when the casing is threaded out of said sleeve.

References Cited in the file of this patent

UNITED STATES PATENTS

| | | |
|---|---|---|
| 922,657 | Worsey | May 25, 1909 |
| 1,849,042 | Pickard | Mar. 8, 1932 |
| 2,108,798 | Dalrymple | Feb. 22, 1938 |
| 2,431,782 | Walton | Dec. 2, 1947 |
| 2,544,244 | Vokes | Mar. 6, 1951 |

FOREIGN PATENTS

| | | |
|---|---|---|
| 163,252 | Great Britain | May 19, 1921 |
| 420,326 | Great Britain | Nov. 29, 1934 |
| 523,919 | Great Britain | July 25, 1940 |
| 707,718 | Great Britain | Apr. 21, 1954 |
| 761,611 | Great Britain | Nov. 14, 1956 |